(12) United States Patent
Katsuki

(10) Patent No.: US 7,751,295 B2
(45) Date of Patent: Jul. 6, 2010

(54) OPTICAL DISK DEVICE

(75) Inventor: Manabu Katsuki, Yokohama (JP)

(73) Assignees: Hitachi, Ltd., Tokyo (JP); Hitachi LG Data Storage, Inc., Tokyo (JP)

( * ) Notice: Subject to any disclaimer, the term of this patent is extended or adjusted under 35 U.S.C. 154(b) by 1092 days.

(21) Appl. No.: 11/430,933

(22) Filed: May 10, 2006

(65) Prior Publication Data

US 2006/0285468 A1 Dec. 21, 2006

(30) Foreign Application Priority Data

Jun. 16, 2005 (JP) .............................. 2005-175864

(51) Int. Cl.
*G11B 7/00* (2006.01)
(52) U.S. Cl. .............. 369/59.22; 369/47.26; 369/47.35; 369/59.17
(58) Field of Classification Search ............... 369/59.22
See application file for complete search history.

(56) References Cited

U.S. PATENT DOCUMENTS

| 6,792,063 B1 | 9/2004 | Ogura | |
|---|---|---|---|
| 6,836,511 B1 * | 12/2004 | Marukawa | ................... 375/232 |
| 2002/0159350 A1 * | 10/2002 | Ogura et al. | ............. 369/47.35 |

FOREIGN PATENT DOCUMENTS

| JP | 09-330564 A | 12/1997 |
|---|---|---|
| JP | 11-086441 | 3/1999 |
| JP | 11-185386 | 7/1999 |
| JP | 2000-105901 | 4/2000 |
| JP | 2000-123487 A | 4/2000 |
| JP | 2001-195830 A | 7/2001 |
| JP | 2001-339263 | 12/2001 |
| WO | WO 00/36602 A | 6/2000 |

OTHER PUBLICATIONS

Nakajima Takeshi JP 09-330564 English translation Dec. 1997 Digital information reproducing equipment.*
Japanese Office Action issued in Japanese Patent Application No. JP 2005-175864 dated May 12, 2009.

* cited by examiner

*Primary Examiner*—Wayne R. Young
*Assistant Examiner*—Van N Chow
(74) *Attorney, Agent, or Firm*—McDermott Will & Emery LLP

(57) ABSTRACT

Quantization noise due to analog-to-digital conversion may be larger than a noise component of an input signal, and therefore sufficient performance may not be obtained. An optical disk device includes an optical head for reading a signal recorded in an optical disk, an analog equalization circuit having an equalization characteristic that amplifies a predetermined frequency band of a signal read by the optical head, a converter for converting a signal equalized by the analog equalization circuit into a digital signal, a digital equalization circuit for adjusting a frequency characteristic of a signal digitized by the converter, a detector for detecting a level of a signal having minimum length in the signal digitized by the converter, and a decoding circuit that decodes a signal equalized by the digital equalization circuit using a maximum likelihood decoding method, wherein the analog equalization circuit has an equalization characteristic of amplifying a frequency corresponding to the signal having the minimum length in the signal recorded in the optical disk.

3 Claims, 2 Drawing Sheets

OPTICAL DISK DEVICE

BACKGROUND OF THE INVENTION

1. Field of the Invention

The present invention relates to an optical disk device for reproducing data recorded in an optical disk.

2. Description of the Related Art

Improvement in recording density and reproduction speed is now necessary to be achieved in an optical disk with increase in capacity of the optical disk. As a method for responding to this, a technique has been proposed, in which a reproduction signal is sampled to be made into a digital signal using an analog-to-digital converter, and then equalized to conform to a predetermined equalization characteristic using a digital signal processing method such as PRML (Partial Response Maximum Likelihood) method, so that recording data are restored more accurately (for example, refer to JP-A-2000-123487 (patent literature 1) and JP-A-9-330564(patent literature 2)).

SUMMARY OF THE INVENTION

However, in patent literature 1, quantization errors associated with quantization occur in the analog-to-digital converter, and for example, in the case that a bit number of the analog-to-digital converter is small, or in the case that amplitude of an inputted reproduction signal is small, quantization noise due to analog to digital conversion is sometimes larger than a noise component of an inputted signal, and therefore sufficient performance may not be obtained. In a digital equalization circuit, this is more significant particularly by equalizing a response of a minimum-length signal to conform to a predetermined equalization characteristic. That is, in this case, a high frequency band of a signal spectrum of the digital equalization circuit is enhanced; and in particular, when such a characteristic that while a noise spectrum due to quantization noise is constant independently of a frequency band, a spectrum of a reproduction signal to be subjected to the analog-to-digital conversion is decreased with increase in frequency is considered, the quantization noise tends to be relatively larger than the noise spectrum of the reproduction signal. In this case, high-frequency noise after equalization is dominated by the quantization noise, and consequently an S/N ratio as a ratio of a signal level to a noise level may be reduced.

Similarly as the patent literature 1, patent literature 2 does not mention on improving the S/N ratio by controlling the equalization characteristic of the minimum-length signal which significantly affects on the equalization characteristic of the reproduction signal. Moreover, since the equalization characteristic of the reproduction signal needs to be determined after level variation of signals having multiple lengths (for example, 3 T and 4 T) contained in the reproduction signal of the optical disk has been obtained; control is more complicated, which is disadvantageous particularly in high-speed reproduction.

It is desirable to provide an optical disk device which has an improved S/N ratio and is highly reliable.

According to embodiments of the invention according to claims, there is provided the optical disk device which has the improved S/N ratio and is highly reliable.

BRIEF DESCRIPTION OF THE DRAWINGS

Embodiments of the present invention will be described in detail based on the following figures, wherein.

DETAILED DESCRIPTION OF THE PREFERRED EMBODIMENT

An analog equalization unit, which has an equalization characteristic of enhancing a predetermined frequency band of a reproduction signal and attenuating an unnecessary frequency band is disposed before an analog-to-digital converter that performs analog-to-digital conversion to an analog equalization signal equalized by the analog equalization unit instead of a low-frequency cut-off filter, and the equalization characteristic of the analog equalization unit is set such that average amplitude of a minimum-length signal in the analog equalization signal inputted into the analog-to-digital conversion unit has a predetermined value or more, thereby the device is realized.

Figure 1:
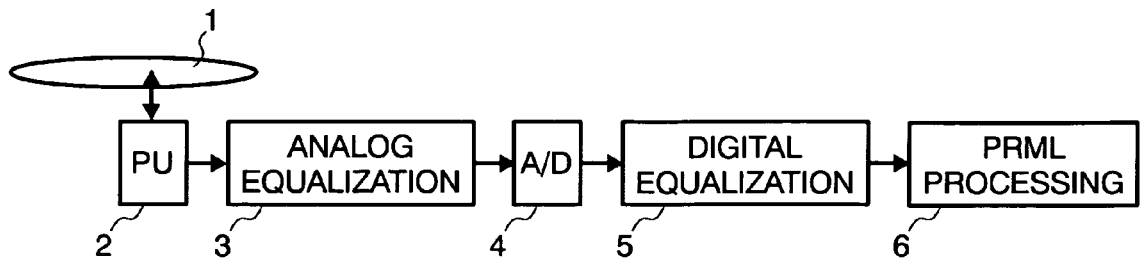
FIG. 1 is a block diagram showing a first embodiment of the invention.

FIG. 1 is a block diagram of an optical disk device of an embodiment of the invention. Hereinafter, an example of reproduction operation is described using FIG. 1.

Figure 2A:
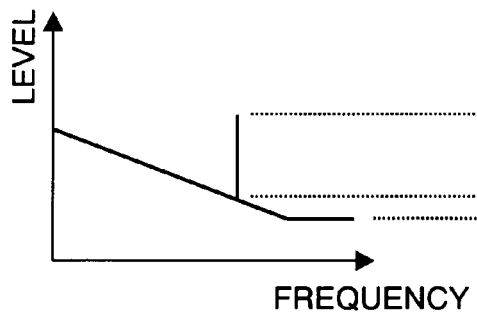
FIG. 2A to FIG. 2D are views showing spectra of a minimum-length signal in various sections.
Figure 2B:
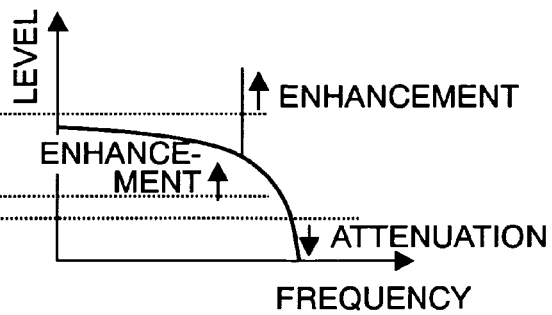
Figure 2C:
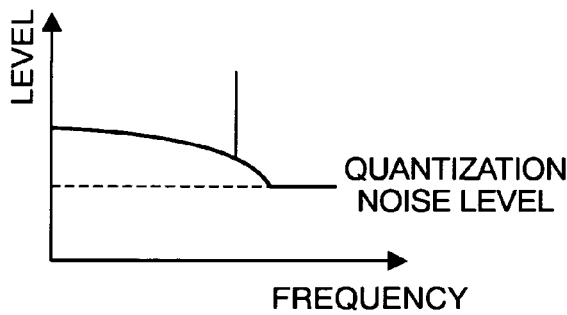
Figure 2D:
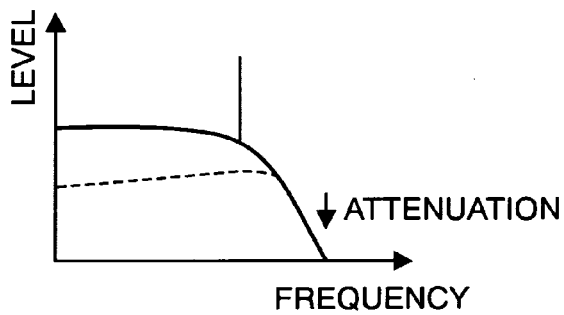

A signal recorded in an optical disk 1 is read by an optical head 2 and supplied to an analog equalization circuit 3 as a reproduction signal, wherein a predetermined frequency band is enhanced and an unnecessary frequency signal is attenuated. Then, an analog equalization signal equalized by the analog equalization circuit 3 is quantized with a clock in synchronization with the reproduction signal by an analog-to-digital converter 4, so that a digital reproduction signal is generated. The digital reproduction signal is equalized to have a desired characteristic by a digital equalization circuit 5 and then accurately decoded by a PRML decoding circuit 6. Here, an equalization characteristic of the analog equalization circuit 3 can be externally set, and for example, the equalization characteristic is determined such that average amplitude of the minimum-length signal has a predetermined value or more. FIGS. 2A to 2D show an example of signal spectra in the case that the minimum-length signal at that time is reproduced. In the figures, FIG. 2A shows a frequency spectrum of a reproduction signal outputted from the optical head 2. The reproduction signal outputted from the optical head 2 has such a high-frequency attenuation characteristic that a reproduction level is decreased with increase in frequency due to a frequency characteristic determined by an optical system of the optical head; therefore a level of the minimum-length signal is low. Moreover, a noise spectrum is a sum of spectra of disk noise due to the optical disk 1 and noise of an amplifier used in the optical head 2, and as shown in FIG. 1A, the disk noise that shows the high-frequency attenuation characteristic like the signal is dominant in a frequency band where the signal can be reproduced, and the amplifier noise is dominant in a frequency band higher than that. A signal spectrum equalized by the analog equalization circuit 3 has a pattern as shown in FIG. 2B. The analog equalization circuit enhances a level in a region of a frequency corresponding to the minimum-length signal, and attenuates high-frequency noise which is unnecessary for improving the S/N ratio. FIG. 2C shows a spectrum of a digital reproduction signal quantized by the analog-to-digital converter 4. Here, a dashed line represents quantization noise associated with quantization. In the embodiment, since the level in the region of the frequency corresponding to the minimum-length signal is enhanced before quantization, the quantization noise can be lowered in this frequency band compared with a noise level that the signal originally has. However, since the quantization noise has a flat frequency characteristic, the quantization noise is dominant in the noise level in the unnecessary frequency band. FIG. 4D shows a spectrum of a signal equalized by the digital equalization circuit 5. In the digital equalization circuit 5, the signal is equalized to conform to an equalization characteristic, however, the high frequency band in which the quantization noise is dominant is attenuated here because it is unnecessary frequency band without any signal component. As known from FIG. 4D, according to a configuration of the embodiment, the level in the region of the frequency corresponding to the minimum-length signal is enhanced before quantization, therefore influence by the quantization noise can be sufficiently reduced in output of the digital equalization circuit 5. Thus, decoding can be performed more accurately in the PRML decoding circuit 6, and consequently reliable data can be obtained. Here, a high-frequency enhancement level in the analog equalization circuit 3 is appropriately set with an average value of a signal level of the minimum-length signal in the reproduction signal and a quantization level of the analog-to-digital converter 4, for example, such that the average value of the signal level of the minimum-length signal is 40 times as large as the quantization level, thereby influence of the quantization noise can be stably prevented.

Figure 3:
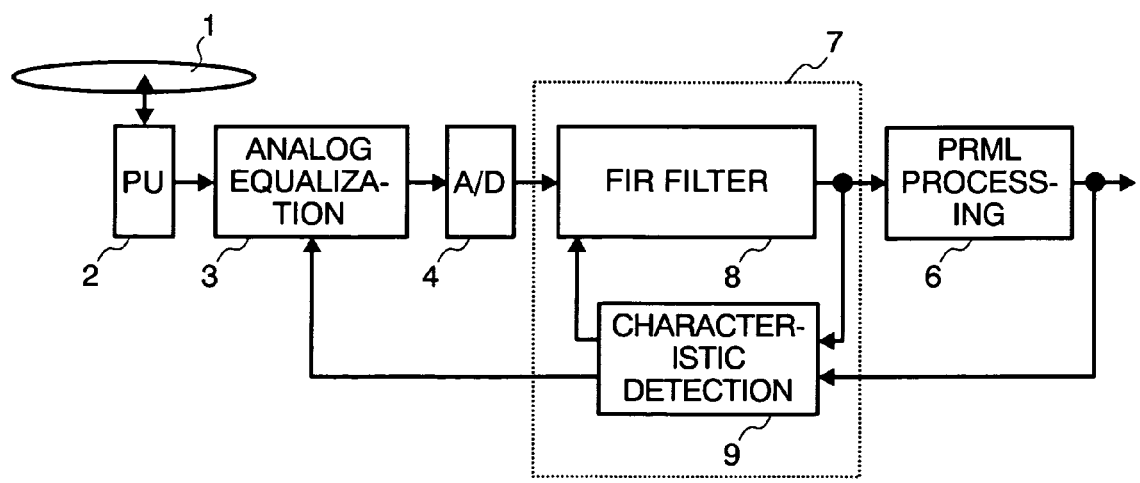
FIG. 3 is a block diagram showing a second embodiment of the invention.

FIG. 3 shows a second embodiment of the invention.

In FIG. 3, circuits having the same functions as circuits in FIG. 1 are marked with the same numbers. For the analog equalization circuit 3, the characteristic of enhancing the level of the region of the frequency corresponding to the minimum-length signal is set similarly as in the embodiment of FIG. 1. Hereinafter, features and operation of the embodiment in FIG. 3 are described. In FIG. 3, a digital equalization circuit 7 is configured by a FIR (Finite Impulse Response) filter 8 and a characteristic detection circuit 9. the characteristic detection circuit 9 produces a teacher signal, for example, from the output of the PRML decoding circuit 6, for example, according to output of the FIR filter 8 and output of the PRML decoding circuit 6 as shown in the figure, and then detects an error of the output of the FIR filter 8 to the teacher signal, and then detects a characteristic error in the output of the FIR filter 8 as an error in a tap coefficient of the FIR filter 8 using the LMS (Least Mean Square) method and the like. The characteristic detection circuit 9 modifies characteristics of the analog equalization circuit 3 and the FIR filter 8 based on the characteristic error. Hereinafter, a method of modifying the characteristics is described.

First, as a first modification method, the characteristic error is reflected on the tap coefficient of the FIR filter 8. That is, the characteristic detection circuit 9 modifies the tap coefficient of the FIR filter 8 based on the obtained characteristic error in order to obtain a digital equalization signal having a desired characteristic. In the method, since the level in the region of the frequency corresponding to the minimum-length signal is enhanced before quantization, the influence of the quantization noise can be sufficiently reduced in the output of the digital equalization circuit 5, in addition, the digital equalization signal having the desired characteristic can be obtained, therefore decoding can be performed more accurately in the PRML decoding circuit 6, and consequently more reliable device can be provided.

Figure 4:
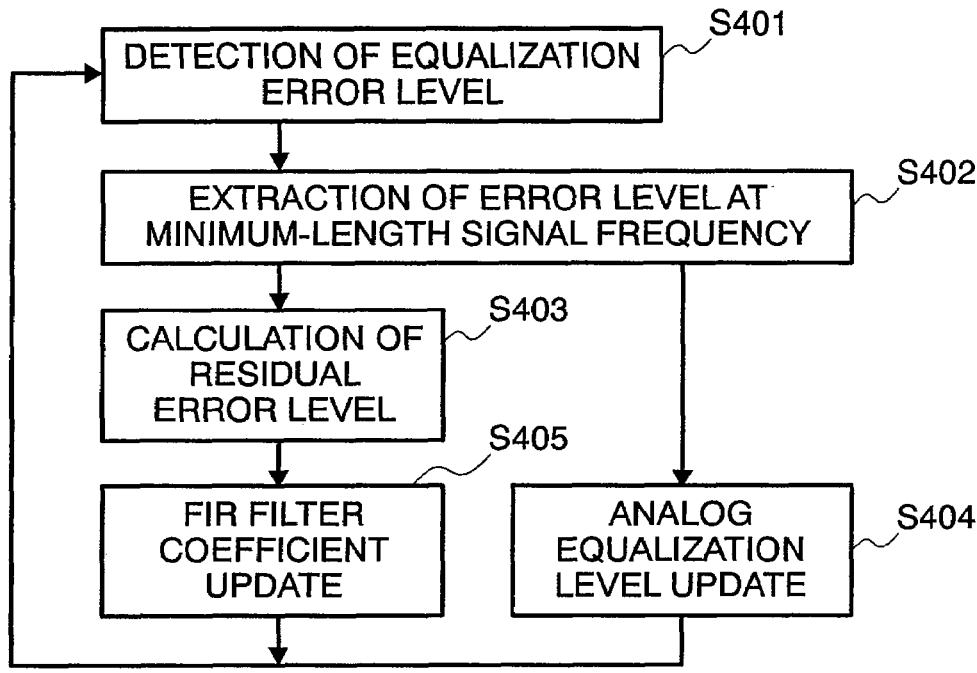
FIG. 4 is a view showing operation flow in the second embodiment of the invention.

Next, a second method of modulating the characteristics is described using FIG. 4. As shown in FIG. 4, first a characteristic error level is detected using the LMS method and the like (S401). Then, a variation level at the minimum-length signal frequency is extracted from a characteristic error level such as a tap-coefficient variation level (S402). This can be obtained, for example, by calculating a response at the characteristic error coefficient of a pseudo minimum-length signal. The characteristic detection circuit 9 controls a high-frequency enhancement level of the analog equalization circuit 3 based on the extracted variation level at the minimum-length signal frequency (S404). Moreover, the circuit 9 calculates a residual error level that is difference between the characteristic error level and the characteristic modification level controlled by the analog equalization circuit 3 (S404). Then, the tap coefficient of the FIR filter is modified based on the residual error level (S405). According to the method, the desired digital equalization signal can be obtained similarly as in the first method, in addition, since the high-frequency enhancement level of the analog equalization circuit 3 is preferentially controlled, a minimum-length signal level of the signal inputted into the analog-to-digital converter 4 can be kept to be a certain level or more at any time, and an excellent signal that is less affected by the quantization noise in the analog-to-digital converter 4 can be obtained. Therefore, coding can be performed more accurately in the PRML decoding circuit 6, and consequently more reliable device can be provided.

As above, the analog equalization circuit 3 has an equalization characteristic of amplifying the frequency corresponding to the minimum-length signal in the signal recorded in the optical disk. More specifically, when a level of the minimum-length signal detected by the characteristic detection circuit 9 has a value equal to a predetermined value or lower, the circuit 3 tries to increase an amplification factor of the frequency corresponding to the minimum-length signal in the signal recorded in the optical disk. Moreover, the characteristic detection circuit 9 detects the frequency and a phase of the minimum-length signal, and the digital equalization circuit 5 modifies the equalization characteristic depending on shift of the frequency and the phase detected by the characteristic detection circuit 9.

Figure 5:
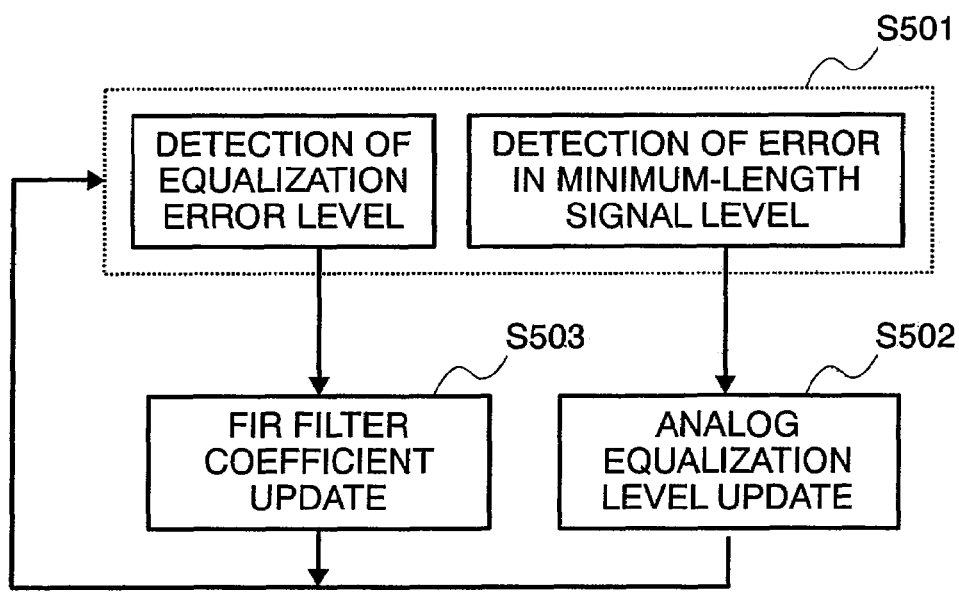
FIG. 5 is a view showing another operation flow in the second embodiment of the invention.

While the characteristic detection circuit 9 has detected the equalization error using the LMS method and the like in the embodiments, the invention is not limited to this, and for example, it may simply perform error detection of the minimum-length signal level in addition to the equalization error detection using the LMS method and the like. A control method at that time is shown in FIG. 5. The characteristic detection circuit 9 detects the error of the minimum-length signal level in addition to the equalization error (S501). Here, the error detection of the minimum-length signal level is performed as follows: for example, delay matching is performed to detect an output signal level of the FIR filter 8 when the minimum-length signal is detected by the PRML decoding circuit 6, and then the level is compared with a desired value, thereby the error of the level is obtained. Then, the characteristic detection circuit 9 modifies the equalization characteristic of the analog equalization circuit based on the error of the minimum-length signal level (S502), and reflects the equalization error on the tap coefficient of the FIR filter 8 to modify the characteristic of the filter (S503). At that time, the modification level in the FIR filter 8 is decreased with respect to the modification level in the analog equalization circuit 3, for example, by multiplying the modification level in the filter by an attenuation coefficient, thereby control in the analog equalization circuit 3 can be preferentially performed, and consequently control can be stably performed. Again in this method, since the minimum-length signal level of the signal inputted into the analog-to-digital converter 4 can be kept to be a certain level or more at any time, a signal that is less affected by the analog-to-digital converter 4 and has a desired characteristic through the FIR filter 8 can be obtained. Therefore, coding can be performed more accurately in the PRML decoding circuit 6, and consequently more reliable device can be provided.

As described hereinbefore, according to the embodiments, since the high-frequency band of the reproduction signal is enhanced before the signal is inputted into the analog-to-digital converter, influence of quantization noise due to analog-to-digital conversion can be particularly reduced even on the minimum-length signal level having particularly small reproduction amplitude, and consequently a sufficient S/N ratio can be secured even in the signal that has been subjected to digital equalization. Thus, coding can be performed more accurately in the PRML decoding circuit 6, and consequently more reliable device can be provided.

What is claimed is:

1. An optical disk device that performs analog-to-digital conversion of a reproduction signal made by reproducing a signal recorded in an optical disk, the optical disk device comprising:

an analog equalization circuit having an equalization characteristic of enhancing a predetermined frequency band of the reproduction signal and attenuating an unnecessary frequency band;

an analog-to-digital converter that performs analog-to-digital conversion to an analog equalization signal equalized by the analog equalization circuit;

a digital equalization circuit that adjusts a frequency characteristic of a reproduction signal digitized by the analog-to-digital converter; and a PRML decoding circuit that decodes a digital equalization signal equalized by the digital equalization circuit, wherein:

the digital equalization circuit is configured in a way that it has a signal characteristic detector that detects a signal characteristic of the digitized reproduction signal, and controls the equalization characteristic of the analog equalization circuit depending on a detected signal characteristic, and the signal characteristic detector is configured in a way of further controlling an equation characteristic of the digital equation circuit depending on the detected signal characteristics.

2. The optical disk according to claim 1, wherein the signal characteristic detector is operated in a way of preferentially modifying the characteristic of the analog equalization circuit with respect to the digital equalization circuit.

3. The optical disk according to claim 1, wherein the signal characteristic detector is operated in a way of controlling the analog equalization circuit and the digital equalization circuit in a time series manner.

\* \* \* \* \*